Feb. 26, 1924.
W. FAETHE
MOWER
Filed Oct. 12, 1921
1,484,631
3 Sheets-Sheet 1
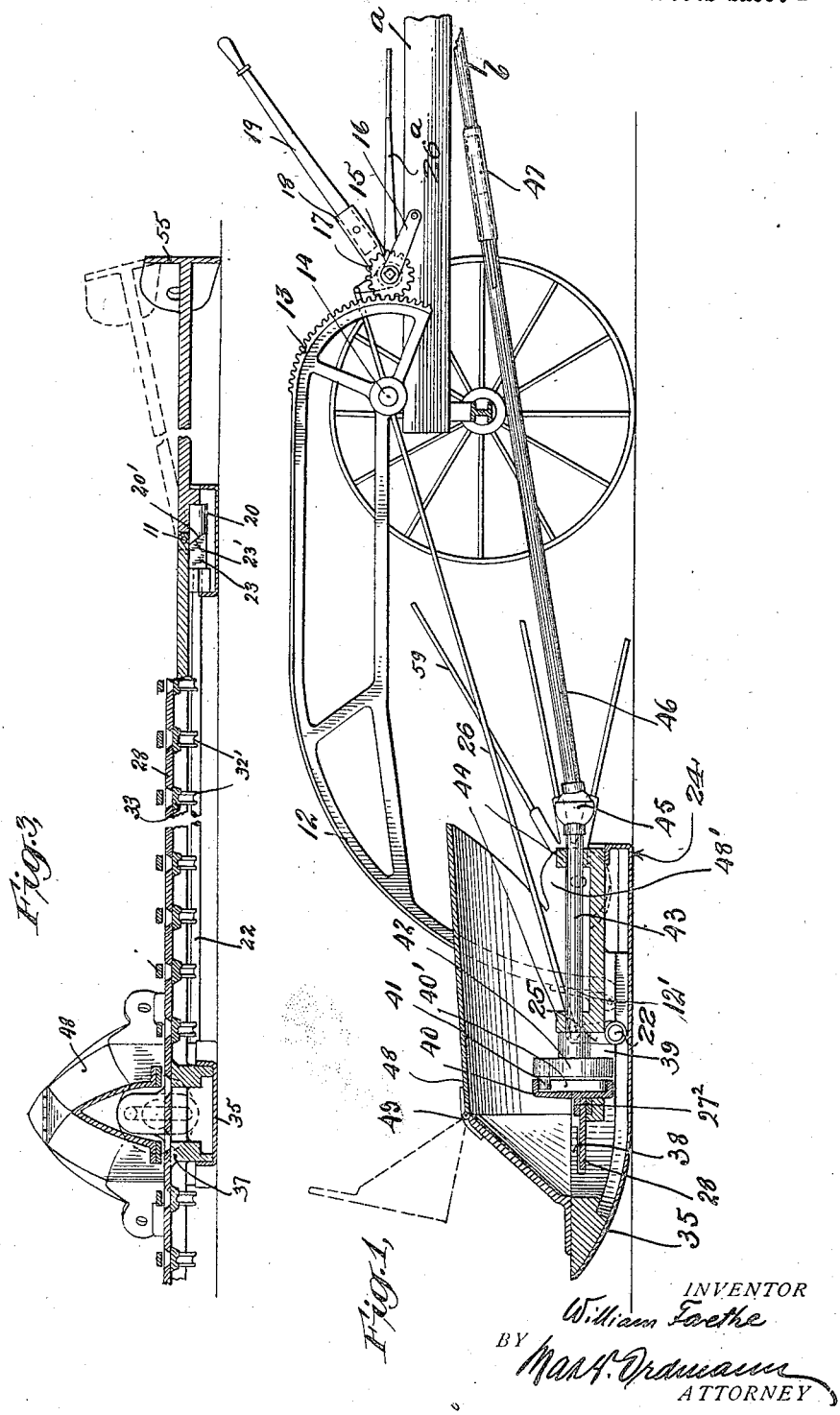
INVENTOR
William Faethe
BY
ATTORNEY

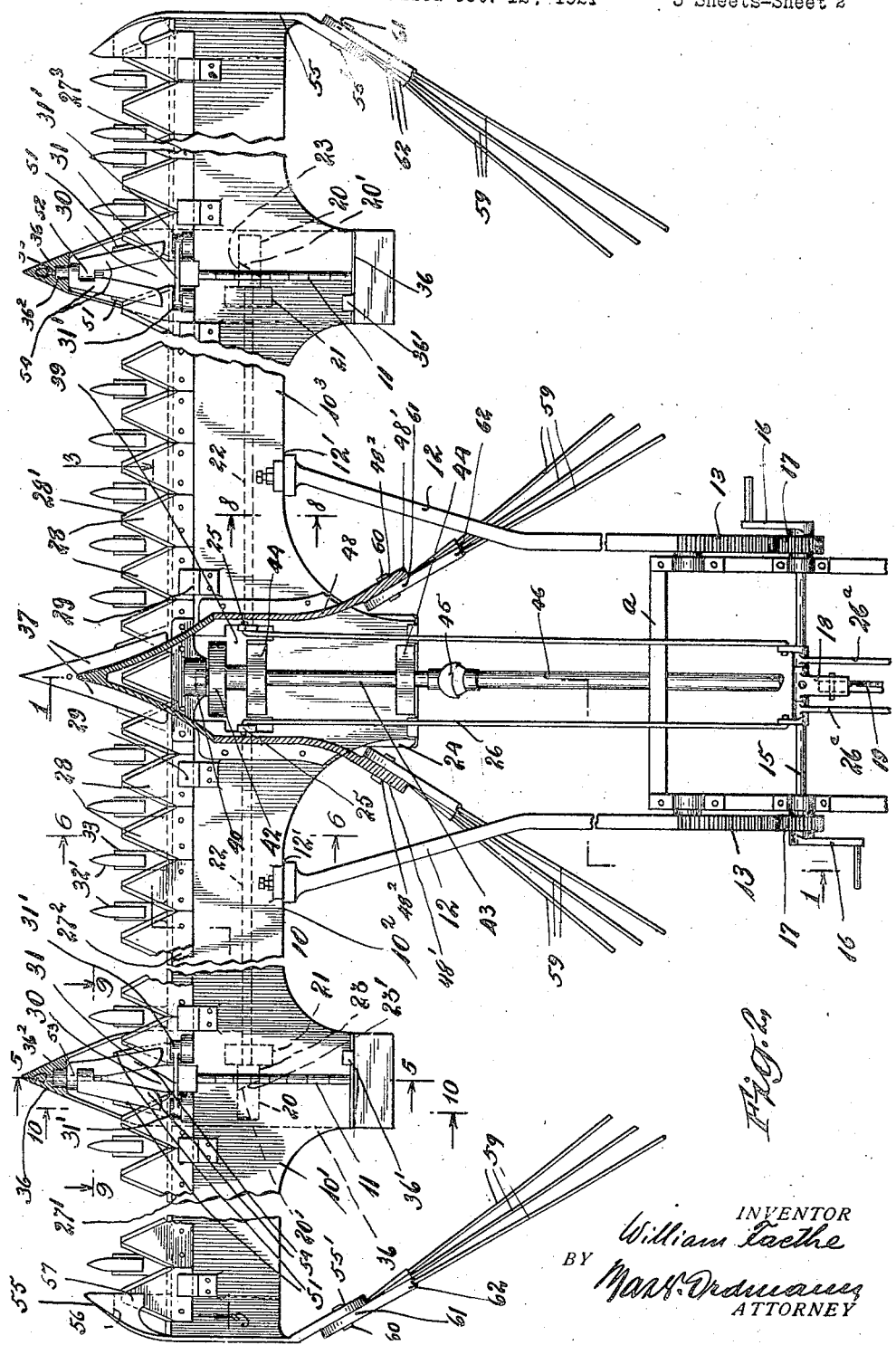

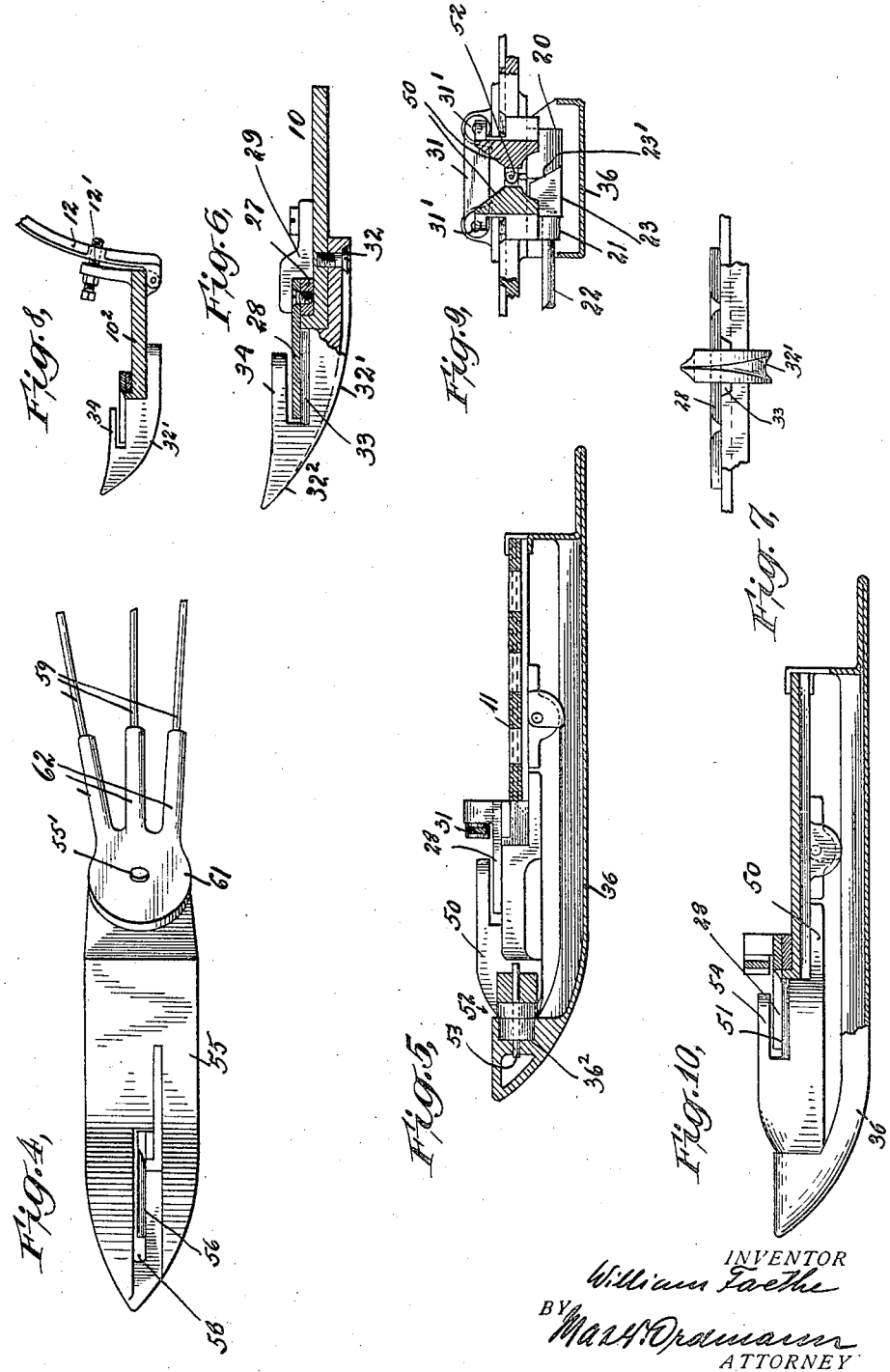

Patented Feb. 26, 1924.

1,484,631

UNITED STATES PATENT OFFICE.

WILLIAM FAETHE, OF RAVEN ROCK, NEW JERSEY.

MOWER.

Application filed October 12, 1921. Serial No. 507,189.

*To all whom it may concern:*

Be it known that I, WILLIAM FAETHE, a citizen of the United States of America, and a resident of Raven Rock, county of Hunterdon, State of New Jersey, have invented certain new and useful Improvements in Mowers, of which the following is a specification.

The present invention relates to mowers and particularly to such adapted to be driven by tractors, and has for its object to provide a construction which will permit the cutter frame to be readily applied in front of the tractor.

Another object is to construct the cutter frame so that it will adjust itself to the unevenness of the ground.

A still other object is to provide a construction which will permit the cutter frame to be raised and folded for transportation purposes or when passing through narrow lanes.

With these and other objects in view my invention consists in the novel construction, combination and arrangement of parts as will be hereinafter fully described and defined in the appended claims.

In the accompanying drawings in which similar reference characters denote corresponding parts, Fig. 1 is a longitudinal section one line 1—1 of Fig. 2 of the mower shown attached to the tractor; Fig. 2 is a top plan view thereof with the hood shown in section; Fig. 3 is a longitudinal section on line 3—3 of Fig. 2; Fig. 4 is an elevation of one of the end guards of the cutter frame showing the attachment of the stacking forks; Fig. 5 is a cross section on line 5—5 of Fig. 2; Fig. 6 is a cross section on line 6—6 of Fig. 2; Fig. 7 is a front view of the shoe and guard shown in Fig. 6; Fig. 8 is a cross section on line 8—8 of Fig. 2; and Figs. 9 and 10 are respectively cross and longitudinal sections on lines 9—9 and 10—10 of Fig. 2.

Referring to the drawing in detail $a$ denotes the tractor frame of any suitable construction and $b$ a spindle driven by a motor (not shown).

The cutter frame 10 of the mower is divided longitudinally in three sections $10'$, $10^2$ and $10^3$ of which $10^2$ is the central section and $10'$, $10^3$ are the lateral sections or wings. These wings are each hinged at 11 or otherwise pivotally connected to the ends of the central section, so that the cutter frame while in operation may be adjusted to the unevenness of the ground over which it moves or folded when not in use.

The central section $10^2$ of the cutter frame has attached to its rear by suitable adjustable means as at $12'$ two lateral curved arms 12 extending rearwardly and which at their rear ends are formed integral with toothed segments 13 centrally fulcrumed at 14 on the tractor frame, so that the arms 12 are capable of swinging around the fulcrums 14 thereby raising or lowering the cutter frame 10. Extending transversely of and loosely mounted in suitable bearings on said frame is a spindle 15 which carries a crank arm 16 at each end and toothed wheels 17 adapted to mesh with said toothed segments 13. In addition to the cranks 16 I provide on the spindle 15 a tubular arm 18 in which is removably fixed a lever 19 whereby the raising and lowering of the cutter frame through the medium of the gears 17 and segments 13 can be conveniently effected from the driver's seat (not shown) while the tractor is operated.

For the raising and lowering of the lateral wings $10'$, $10^3$ of the cutter frame from the driver's seat I provide the following means:—

Attached to the under face of each lateral wing is a member 20 extending transversely thereof and the inner face of which is cam shaped as at $20'$. Opposite each cam surface there is a bracket 21 in which bears one end of a spindle or rod 22, the two spindles or rods 22 extending longitudinally of the cutter frame and each carrying at its outer end a member 23 having a cam surface $23'$ adapted to slidably bear on the opposite cam surface $20'$ and in cooperation therewith to swing the corresponding wing upwardly or downwardly when the spindles 22 are oscillated. The opposite end of each spindle 22 is suitably supported in the shoe 24 of the central cutter, that will be hereinafter described, and carries a crank arm 25, to which is attached one end of a rod 26. These rods 26 extend rearwardly toward the tractor and are attached to pedals $26^a$ loosely mounted on the spindle 15. By the operation of the pedals the spindles 22 will be oscillated and through the cooperation of the cam members 20 and 23 adjust the wings vertically according to the direction of oscillation of the spindles 22.

The cutter bar 27 is provided with the usual cutters or sickles 28 and is slidably mounted in guides 29 fixed to the cutter frame 10, to be capable of reciprocating longitudinally thereof. To enable the folding or swinging of the lateral sections 10', 10³ the cutter bar too is divided into three sections 27', 27², 27³ and the sections 27', 27³ extending over the wings 10', 10³ are somewhat separated from those extending over the central section, as at 30, and are connected to the latter by links 31 pivoted at 31' to the adjacent ends of said sections.

Fixed to the surface of the cutter frame, as at 32, and projecting forwardly therefrom are a plurality of shoes 32' the forward ends of which are pointed and curved upwardly, as at 32². These shoes carry the blades 33, the lateral edges of which are adapted to cooperate with the bevelled sharp edges 28' of the cutters 28 in performing the cutting operation. From the pointed ends of the shoes project rearwardly extensions 34 serving as guards. The cutter bar 27 and cutters 28 while reciprocating over the shoes pass through the spaces between the latter and the tongues or guards 34. The middle shoe 35 and the shoes 36 opposite the hinges 11 are enlarged and somewhat modified in construction. These shoes extend transversely over the entire width of the cutter frame 10 and are suitably secured thereto. The shoe 35 is made hollow and supports on its longitudinal edges near the pointed end two rearwardly diverging arms 37 over which extend the guards 38. A part of the cutter frame at the rear of the cutter bar is recessed as at 39. The cutter bar section 27² is formed at its rear with a centrally disposed member 40 projecting partly downwardly through the recess 39 into the interior of the shoe 35 and partly upwardly. This member has a vertical groove 40' to engage a crank pin 41, which projects from a vertically disposed disk 42 fixed on the forward end of a spindle 43. The latter extends centrally and transversely of the frame section 10² and is rotatively supported in brackets 44 fixed on the latter. The rear end of said spindle 43 is connected by a universal joint 45 to a shaft 46 which may be suitably coupled as at 47 to the motor driven spindle $b$ of the tractor.

The crank disk 42 is adapted to project through the recess 39 into the interior of the shoe 35 and be shielded by the latter so that trash and refuse will not engage therewith. For shielding the crank dish 42, arms 37 and cutters 28 from above, I provide a hood 48 of the shape substantially as shown, which may be suitably fixed to the frame section 10². The hood 48 may be transversely divided into two parts or sections which may be hinged or pivotally joined at 49 so that one of the sections can be easily opened to afford access to the working parts shielded by the hood (as shown by the dotted lines in Fig. 1).

The hood is provided with lateral rearwardly diverging extensions 48' the object of which will be hereafter explained.

For the hinged portions of the cutter frame the construction of the shoes and guards is as follows:

Fixed to the underface of each of the adjoining frame sections are two cross members 50 which project forwardly and each cross member serves as a carrier for a blade 51. These two cross members converge towards their forward end, and are hinged together as at 52. The shoe 36 embracing the hinged portions is fixed at the rear to only one of the adjoining frame sections, as at 36', and at its forward pointed end is formed with a socket 36² to loosely embrace one of the members 50 and engage the pin 53 of the hinge 52, thus enabling the wings 10' and 10³ to swing vertically, while shielding the hinges 52 and 11.

Each member 50 is formed with rearward extensions 54 serving as guards.

The end shoes 55 are fixed to the extreme ends of the wings 10', 10³ and are preferably shaped as shown. The same carry the blades 56 and guards 57 and are laterally recessed as at 58 to form passages for the cutter bar.

The cutter frame may be provided with the usual stacking forks 59. To facilitate the attachment thereof and to permit the forks to easily adjust themselves vertically while sliding over uneven ground the rear ends of the end shoes 55 which are curved or bent inwardly and the diverging extensions 48' of the hood are provided with bearings 55' and 48² for pivotally supporting pins 60 on which are fixed disk shaped members 61. These members are formed on their circumferences with radially extending tubular projections 62 in which the rods constituting the stacking forks 59 may be removably fixed.

It will be seen that the mower as constructed can be readily and easily connected to the tractor and conveniently operated from the driver's seat. When passing over hilly parts or through narrow lanes the wings can be easily raised or folded from the driver's seat.

What I claim is:—

1. A mower having a cutter frame and cutter bar, said frame and cutter bar having end sections and a central section, the sections of said cutter frame being pivotally connected together and the sections of the cutter bar being separated and linked together to enable the raising and lowering of the end sections and means for raising and lowering the central section of said cutter frame.

2. In combination with a tractor, a mower having a sectional cutter frame and sectional cutter bar, the sections of which are pivotally connected, toothed arms fulcrumed to said tractor and gears on said tractor meshing with said arms for raising and lowering said cutter frame.

3. In combination with a tractor, a mower having a longitudinally foldable cutter frame and cutter bar, means for folding said cutter frame from the tractor, toothed arms fixed to said mower and fulcrumed to said tractor and gears on said tractor meshing with said toothed arms to raise and lower said mower.

4. In combination with a tractor, a mower including a cutter frame having vertically tiltable end sections, cam members for tilting said end section and means controlled from the tractor for operating said cam members.

5. In combination with a tractor, a mower including a cutter frame having vertically tiltable end sections, arms attached to the central part of said frame and formed with toothed segments fulcrumed to the tractor, and gears on said tractor meshing with said segments to raise and lower said central part of said frame.

6. In combination with a tractor, a mower including a cutter frame, arms adjustably attached to the central part of said frame and formed with toothed segments fulcrumed to said tractor and gears on said tractor meshing with said segments to raise and lower said central part of said frame.

7. In combination with a tractor and a driven shaft thereon, a mower including a cutter frame, having tiltable end sections, a cutter bar having tiltable end sections, a spindle for the transmission of reciprocatory motion to said cutter bar, a universal joint between said spindle and driven shaft and cam operated means for tilting said end sections from the tractor.

8. In a mower, a cutter frame, a cutter bar reciprocating thereon, an enlarged central hollow member fixed to said frame and formed with two rearwardly diverging arms to cooperate with the cutters of the cutter bar, said member serving as a casing, and means projecting into said casing and serving for the transmission of motion to said cutter bar.

9. In a mower, a cutter frame, a cutter bar reciprocating thereon, an enlarged central hollow member fixed to said frame and formed with two rearwardly diverging arms to cooperate with the cutters of the cutter bar, said member serving as a casing, means projecting into said casing and serving for the transmission of motion to said cutter bar and a hood to cover said means from above.

10. In a mower, a cutter frame having tiltable end sections and a central section, cam members fixed to said end sections, spindles borne in the central section and carrying counter-cam members adapted to cooperate with said first named cam members and pedal controlled means for operating said spindles to raise or lower said end sections.

Signed at New York, this 7th day of October, 1921.

WILLIAM FAETHE.

Witnesses:
JOSEPH T. MCMAHON,
MAX D. ORDMANN.